(12) United States Patent
Ron et al.

(10) Patent No.: US 11,212,874 B2
(45) Date of Patent: Dec. 28, 2021

(54) METHODS AND DEVICES ASSOCIATED WITH DIRECT COMMUNICATIONS IN A RADIO ACCESS NETWORK

(71) Applicant: JRD COMMUNICATION (SHENZHEN) LTD, Guangdong (CN)

(72) Inventors: Roy Ron, Guangdong (CN); Olivier Marco, Guangdong (CN)

(73) Assignee: JRD COMMUNICATION (SHENZHEN) LTD, Guangdong (CN)

( * ) Notice: Subject to any disclaimer, the term of this patent is extended or adjusted under 35 U.S.C. 154(b) by 44 days.

(21) Appl. No.: 16/611,161

(22) PCT Filed: May 4, 2018

(86) PCT No.: PCT/CN2018/085587
§ 371 (c)(1),
(2) Date: Nov. 5, 2019

(87) PCT Pub. No.: WO2018/202120
PCT Pub. Date: Nov. 8, 2018

(65) Prior Publication Data
US 2020/0196387 A1    Jun. 18, 2020

(30) Foreign Application Priority Data
May 5, 2017    (GB) ...................................... 1707249

(51) Int. Cl.
*H04W 88/04*    (2009.01)
*H04W 76/14*    (2018.01)
(Continued)

(52) U.S. Cl.
CPC ............ *H04W 88/04* (2013.01); *H04W 4/80* (2018.02); *H04W 28/0278* (2013.01);
(Continued)

(58) Field of Classification Search
CPC . H04W 72/0413; H04W 88/04; H04W 76/14; H04W 72/1278; H04W 88/02; H04W 4/80; H04W 28/0278
(Continued)

(56) References Cited

U.S. PATENT DOCUMENTS 10,499,275 B2 * 12/2019 Kim .................. H04W 28/0278
2012/0236782 A1 * 9/2012 Bucknell ........... H04W 72/1221
370/315
(Continued)

FOREIGN PATENT DOCUMENTS

CN    106160951 A    11/2016
EP    3 107 320 A1    12/2016
(Continued)

*Primary Examiner* — Rownak Islam
(74) *Attorney, Agent, or Firm* — BakerHostetler

(57) ABSTRACT

A method for enabling a wireless communication device to operate in a radio access network as a network relay device to a remote device, using a short range communication channel there between, wherein the communication device receives a control indication signal from the remote device as an indication of future data between the communication device and the remote device via the short range communication channel which forms part of a sidelink communication between the relay device and the remote device; wherein the relay device decodes the control indication signal from the remote device to extract a time allocation for future data.

6 Claims, 5 Drawing Sheets

(51) Int. Cl.
  *H04W 4/80* (2018.01)
  *H04W 28/02* (2009.01)
  *H04W 72/04* (2009.01)
  *H04W 72/12* (2009.01)
(52) U.S. Cl.
  CPC ... *H04W 72/0413* (2013.01); *H04W 72/1278* (2013.01); *H04W 76/14* (2018.02)
(58) Field of Classification Search
  USPC .......................................................... 370/329
  See application file for complete search history.

(56) References Cited

U.S. PATENT DOCUMENTS

| | | | | |
|---|---|---|---|---|
| 2015/0282213 A1* | 10/2015 | Sun | .................... | H04W 74/0833 |
| | | | | 370/329 |
| 2017/0094654 A1* | 3/2017 | Yang | ................. | H04W 28/0252 |
| 2017/0311338 A1* | 10/2017 | Tanaka | .............. | H04W 72/0413 |
| 2019/0028177 A1* | 1/2019 | Feng | ..................... | H04W 72/04 |
| 2019/0166486 A1* | 5/2019 | Tang | ..................... | H04W 88/04 |
| 2020/0029353 A1* | 1/2020 | Xu | ..................... | H04W 72/1284 |

FOREIGN PATENT DOCUMENTS

| | | | |
|---|---|---|---|
| EP | 3 148 285 A1 | 3/2017 |
| WO | 2017/029646 A1 | 2/2017 |
| WO | 2017/134578 A1 | 8/2017 |

\* cited by examiner

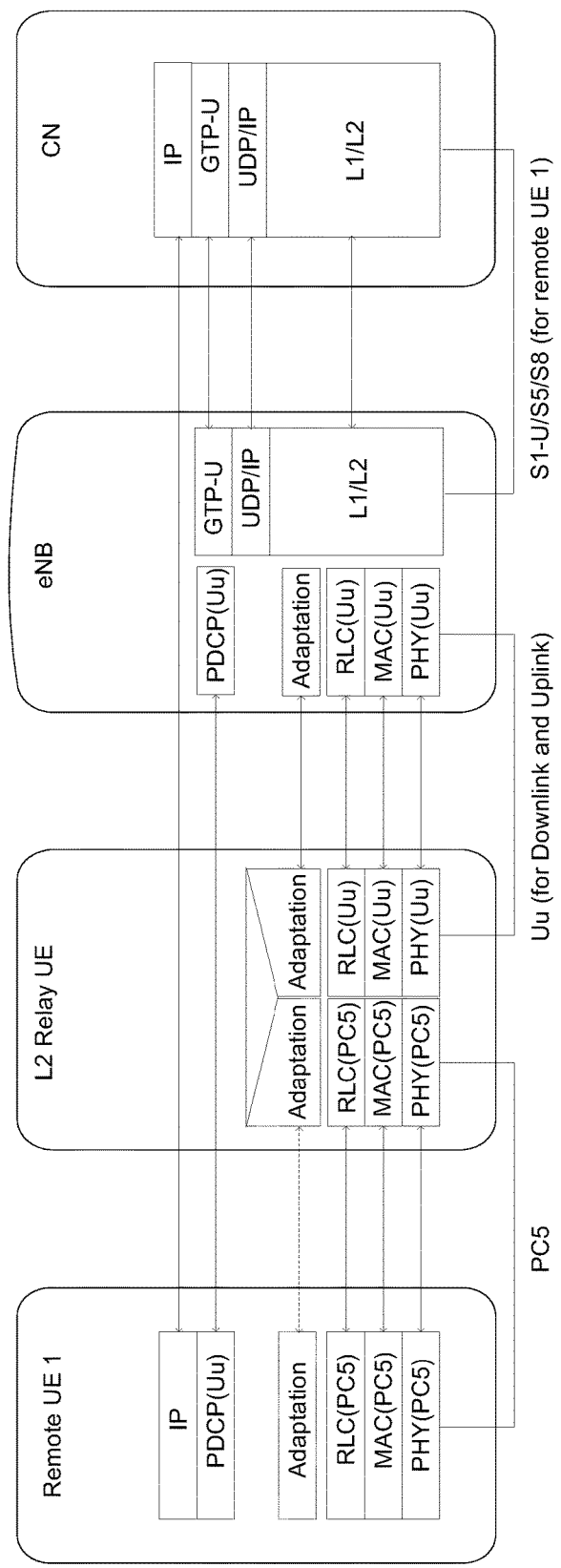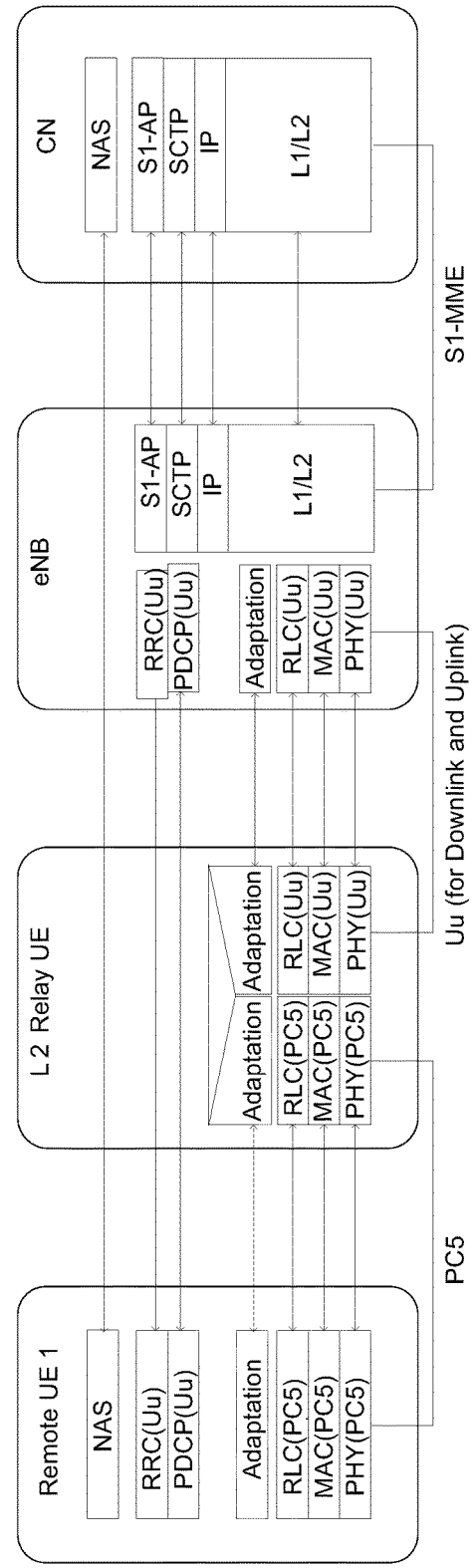
Figure 1
Figure 1a

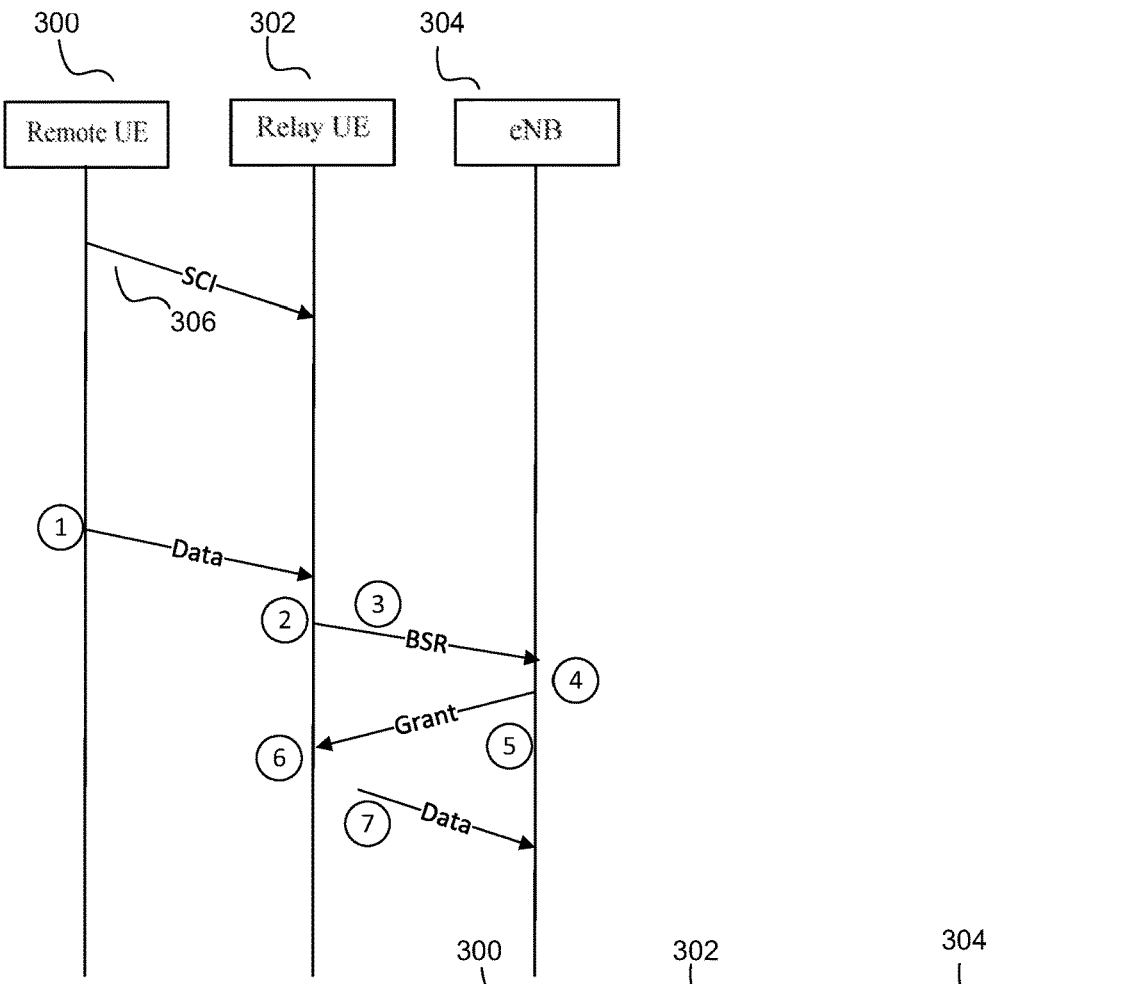
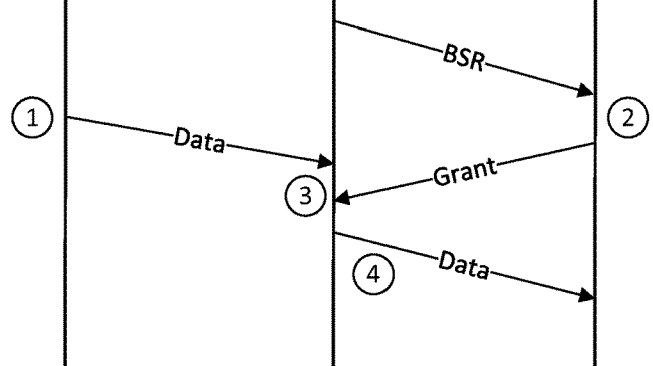
Figure 3

| step | Description | Time (TTIs) |
|---|---|---|
| 1 | eRemote UE sends transport data over sidelink | 1 |
| 2 | eRelay UE decodes and repack the data | 3 |
| 3 | eRelay sends BSR to eNB | 1 |
| 4 | eNB decodes BSR and generates the Scheduling Grant | 3 |
| 5 | Transmission of Scheduling Grant | 1 |
| 6 | eRelay Processing Delay (decoding of scheduling grant + L1 encoding of relayed data) | 3 |
| 7 | Transmission of relayed data | 1 |
| | Total delay [ms] | 13 |

| step | Description | Time (TTIs) |
|---|---|---|
| 1 | eRemote UE sends transport data over sidelink | 1 |
| 2 | Transmission of Scheduling Grant | 1 |
| 3 | eRelay UE decodes and repack the data + Decoding of the grant | 3 |
| 4 | Transmission of relayed data | 1 |
| | Total delay [ms] | 6 |

Figure 4

METHODS AND DEVICES ASSOCIATED WITH DIRECT COMMUNICATIONS IN A RADIO ACCESS NETWORK

CROSS-REFERENCE TO RELATED APPLICATIONS

This application is a National Stage of International patent application PCT/CN2018/085587, filed on May 4, 2018, which claims priority to foreign Great Britain patent application No. GB 1707249.7, filed on May 5, 2017, the disclosures of which are incorporated by reference in their entirety.

TECHNICAL FIELD

Embodiments of the present invention generally relate to wireless communication systems and in particular to devices and methods for enabling a wireless communication device, such as a User Equipment (UE) or mobile device to access a Radio Access Technology (RAT) or Radio Access Network (RAN), particularly but nor exclusively in conjunction with direct communications, such as D2D communications.

BACKGROUND

Wireless communication systems, such as the third-generation (3G) of mobile telephone standards and technology are well known. Such 3G standards and technology have been developed by the Third Generation Partnership Project (3GPP). The $3^{rd}$ generation of wireless communications has generally been developed to support macro-cell mobile phone communications. Communication systems and networks have developed towards a broadband and mobile system.

The 3rd Generation Partnership Project has developed the so-called Long Term Evolution (LTE) system, namely, an Evolved Universal Mobile Telecommunication System Territorial Radio Access Network, (E-UTRAN), for a mobile access network where one or more macro-cells are supported by a base station known as an eNodeB or eNB (evolved NodeB). More recently, LTE is evolving further towards the so-called 5G or NR (new radio) systems where one or more cells are supported by a base station known as a gNB.

As with other technologies, the E-UTRAN and LTE technologies deal with issues relating to transmission processes and how to improve various aspects thereof.

In a centralized wireless communication network such as LTE, the end point terminals communicate via one or more centralized nodes, such as the base station eNB. At the same time the terminals can also communicate directly with each other over a sidelink channel or another short range link. In such a network there could be a layer 2 (L2) relay architecture where a Relay UE which is in the coverage of the network can relay communication from the network to a Remote UE and/or vice versa.

In LTE, the sidelink interface has a physical sidelink control channel (PSCCH) and a physical sidelink share channel (PSSCH). The PSCCH includes signalling to indicate the resource allocation (time/frequency) and other details from which the transport block size (TBS) can be deduced. The information is incorporated into, for example, a control indication signal or datatype such as a sidelink control indication (SCI). In most case the SCI signal precedes the corresponding PSSCH transmission.

In the LTE medium access control (MAC) layer, the Buffer Status (BS) reporting (BSR) procedure is used to provide the serving eNB with information about the amount of data available for transmission in the UL buffers of the UE.

A UE-to-network relay may use the relay node serves as a layer 3 (L3) router. Data from the remote UE is decoded and unpackaged up to L3 and then packaged again as if it originated at the relay itself before being sent over the air interface channel between UE and eNB (hereinafter the Uu channel). The BSR calculation is therefore preformed regardless of the relay operation. This is described in more detail in TS 36.321§ 0.5.4.5. Once a non-zero BSR is calculated, it may trigger a first random access channel (RACH) and/or a scheduling request (SR) procedure.

The objectives of the Study Item (SI) for further evaluation device to device (feD2D) processes propose to introduce a L2 UE-to-network evolved relay for wearables and the internet of things (IoT). The outcomes of the study are captured in 3GPP TR 36.746. For protocol architecture for the user plane and control plane, relaying is performed above the radio link control (RLC) sublayer. The evolved proximity services (ProSe) Remote UE's user plane and control plane data are relayed above RLC via the evolved ProSe UE-to-Network Relay UE from the evolved ProSe Remote UE to network and vice versa. Uu Packet Data Convergence Protocol (PDCP) and radio resource control (RRC) are terminated between the evolved ProSe Remote UE and the eNB while RLC, MAC and PHY are terminated in each link (i.e. the link between the evolved ProSe Remote UE and the evolved ProSe UE-to-Network Relay UE and the link between the evolved ProSe UE-to-Network Relay UE and the eNB). The user plane protocol stack and the control plane protocol stack when PC5 is used between the evolved ProSe remote UE and the evolved ProSe UE-to-Network Relay UE is shown in FIG. 1 and FIG. 1A.

Traffic of one or multiple evolved ProSe Remote UEs may be mapped to a single DRB of Uu interface of the evolved ProSe UE-to-Network Relay UE. Multiple Uu DRBs may be used to carry traffic of different Quality of service (QoS) classes, for one or multiple evolved ProSe Remote UEs. It is also possible to multiplex traffic of evolved ProSe UE-to-Network Relay UE itself onto the Uu DRB, which is used to relay traffic to/from evolved ProSe Remote UEs. How the mapping of the traffic between sidelink bearers and Uu bearers is done is up to the eNB implementation and the mapping is configured in evolved ProSe UE-to-Network Relay UE by the eNB. An adaptation layer over Uu is supported to identify the evolved ProSe Remote UE/evolved ProSe UE-to-Network Relay UE and the corresponding bearer. Within a Uu DRB, different evolved ProSe Remote UEs and different bearers of the evolved ProSe Remote UE are indicated by additional information included in adaptation layer header which is added to PDCP PDU.

The Sidelink BSR MAC element was introduced in LTE Rel-12. It is used together with the Scheduled resource allocation only (Mode 1 sidelink resource allocation). Scheduled resource allocation is characterized by a number of requirements relating to the UE. These include:

The UE needs to be RRC_CONNECTED in order to transmit data;

The UE requests transmission resources from the eNB. The eNB schedules transmission resources for transmission of sidelink control information and data; and The UE sends a scheduling request (Dedicated Scheduling Request (D-SR) or Random Access) to the eNB followed by a Sidelink BSR. Based on the Sidelink BSR the eNB can determine that the UE has data for a sidelink communication transmission and estimate the resources needed for transmission.

The sidelink BSR is not explicitly used to estimate an expected transmission over the Uu, however during an ongoing relay operation and if the relay link is allocated with scheduled resources and not with autonomous resource selection, then the eNB may be able to estimate an expected need for UL resources.

The present invention is seeking to solve at least some of the outstanding problems in the domain of direct or short range communications, such as sidelink communications.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

According to a first aspect of the present invention there is provided a method for enabling a wireless communication device to operate in a radio access network as a network relay device to a remote device, using a short range communication channel there between, wherein the communication device receives a control indication signal from the remote device as an indication of future data between the communication device and the remote device via the short range communication channel which forms part of a sidelink communication between the relay device and the remote device; wherein the relay device decodes the control indication signal from the remote device to extract a time allocation for future data.

Preferably the relay device signals to a base station, an uplink grant request for the future data.

Preferably the future data requirements are combined in a PSCCH message and include at least one of an expected decode time, a possible data size and a logical channel group to which the data belongs.

Preferably wherein, the PSCCH message includes a sidelink control information.

Preferably the sidelink control information SCI signals a transport block including at least one of a PDCP PDUs or including the last segment of a PDCP PDU for relay.

Preferably the uplink grant request to the base station, is sent before a PSSCH message decoding time to indicate a PUSCH allocation.

Preferably wherein the uplink grant request for the future data comprises a PRG message.

Preferably wherein the uplink grant request reuses a BSR message to indicate the future data requirements.

Preferably the BSR message is enhanced to include a PRG message.

Preferably a dedicated logic channel group is dedicated to the PRG message.

Preferably the PRG message indicates the request for uplink grant timing implicitly based on the time of sending the PRG message.

Preferably the calculation of the timing for sending the PRG message is given by: $T_{prg} = n + T_{dual\_receive} - 1 - T_{processing}$, where: n is the expected time of the PSSCH reception; $T_{dual\_receive} = 0$ if the relay UE is capable of receiving the sidelink transmission or another short range transmission from the remote UE and Uu DL in the same TTI, otherwise, $T_{dual\_receive} = 1$; and $T_{processing}$ is the number of TTIs required by the eNB to process the PRG message. It is also the time required by the relay UE to decode and prepare the received PSSCH transmission for relay.

Preferably the timing of the uplink grant request is included the PRG message.

Preferably the timing of the uplink grant request is signalled by sending the timing association between the PRG message send time and an expected timing of the UL transmission availability.

Preferably the PRG message is sent as soon as an SCI message is decoded.

Preferably the uplink grant request comprises a new message structure.

Preferably the new message structure includes at least one of: an indication of the expected required size; an indication of the timing of the expected data.

Preferably the relay device initiates a RRC connection establishment procedure upon decoding of SCI message.

Preferably the connection establishment procedure is performed with establishment cause 'EstablishmentCause-Relay'.

Preferably wherein the remote device is outside a coverage area of a base station with which the relay device is in communication.

Preferably the Radio Access Network is a LTE/E-UTRAN network.

According to a second aspect of the present invention there is provided a remote device comprising a processor, a storage unit and a communications interface, wherein the processor unit, storage unit, and communications interface are configured to perform the method according to another aspect of the invention.

According to a third aspect of the present invention there is provided a relay device comprising a processor, a storage unit and a communications interface, wherein the processor unit, storage unit, and communications interface are configured to perform the method according to another aspect of the invention.

According to a fourth aspect of the present invention there is provided a base station comprising a processor, a storage unit and a communications interface, wherein the processor unit, storage unit, and communications interface are configured to perform the method according to another aspect of the invention.

According to a fifth aspect of the present invention there is provided a system comprising a remote device according to another aspect of the invention, a relay device according to another aspect of the invention and at least one base station according to another aspect of the invention.

According to a sixth aspect of the present invention there is provided a non-transitory computer readable medium having computer readable instructions stored thereon for execution by a processor to perform the method according to another aspect of the invention.

The non-transitory computer readable medium may comprise at least one from a group consisting of: a hard disk, a CD-ROM, an optical storage device, a magnetic storage device, a Read Only Memory, a Programmable Read Only Memory, an Erasable Programmable Read Only Memory, EPROM, an Electrically Erasable Programmable Read Only Memory and a Flash memory.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale. Like reference numerals have been included in the respective drawings to ease understanding.

FIGS. 1 and 1A are simplified diagrams showing a user plane radio protocol stack for layer 2 evolved UE-to-Network relay (PC5) in accordance with the prior art;

FIG. 3 is a flow chart for data relay with and without BSR timing optimizations, according to an embodiment of the present invention;

FIG. 4 is a table showing the timing of the steps of FIG. 3, according to an embodiment of the present invention;

DETAILED DESCRIPTION OF THE PREFERRED EMBODIMENTS

Those skilled in the art will recognise and appreciate that the specifics of the examples described are merely illustrative of some embodiments and that the teachings set forth herein are applicable in a variety of alternative settings.

The present invention relates to improvement in or relating to sidelink processes and methods in LTE.

Figure 2:
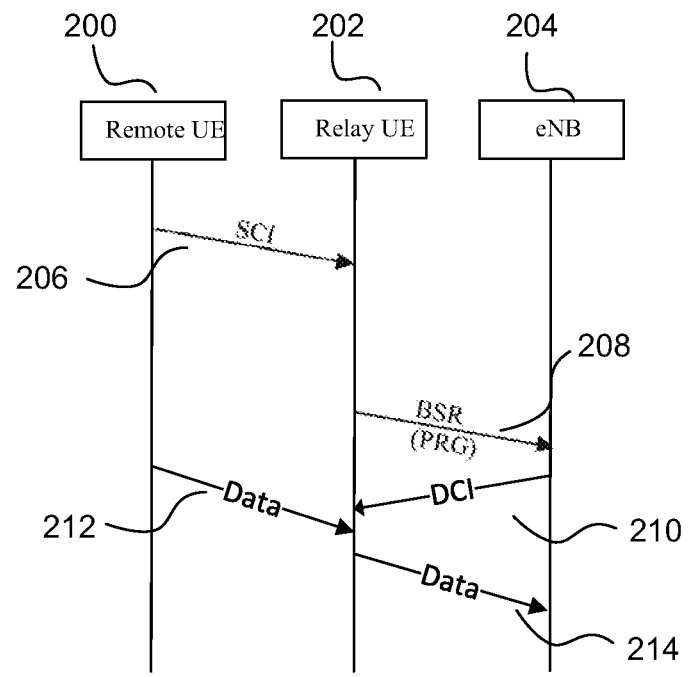
FIG. 2 is a simplified diagram of an uplink relayed communication is shown, according to an embodiment of the present invention.

Referring in general to FIG. 2, an uplink relayed communication is shown. Communication traffic is originated at a remote UE 200 and relayed by a relay UE 202 to the centralized node (eNB) 204. The present invention provides a method and system in which the relay can take advantage of a decoded SCI 206 from the remote UE to signal the eNB an uplink grant requests, such as a Predictive Request for uplink Grant (PRG) 208. For example the relay would compute its own BSR, foreseeing in advance the required Uu resource allocation from the eNB. After the PRG is generated the eNB indicates an UL Grant with the Downlink Control Information (DCI) to the relay UE 210 and data 212 is transmitted from the remote UE to the relay UE and then 214 to the eNB.

In the scope of feD2D architecture, a burst of transport data originated from the remote UE and arriving at the relay would be followed with a BSR from the relay in order to request resources over the Uu. Normally the sidelink data decoding and the BSR are in sequence i.e. the relay would have to decode the sidelink transport data first, repack it or redirect it to a Uu DRB according to an adaptation layer and only then would the relayed data arrive at the relay MAC layer and BSR could be triggered. This may take at least another round trip time (RTT) until resources are signalled and another 4 transmission time intervals (TTI) until the relayed packet is sent. However if the expected decoding time is used in accordance with the present invention, most of the relay additional time would be saved. The resources may be allocated in such timing to allow sending of the relayed data over the Uu as soon as it is available at the relay MAC layer.

FIG. 3 shows a flow chart for data relay with (RHS) and without (LHS) BSR timing optimizations. FIG. 4 is a table showing the latency breakdown for relayed data with and without the BSR timing optimizations illustrated in FIG. 3.

In FIG. 3 a remote UE 300 is in communication with a relay UE 302 located in the coverage area of a base station 304. The remote UE may or may not be in the coverage area of the base station. FIG. 3 shows a normal operation on the LHS and an optimised operation in accordance with the present invention on the RHS.

The numbers 1 to 7 and 1 to 4 correspond to respective steps shown with their timing implications in the table of FIG. 4. In each case an SCI 306 is transmitted from the remote UE to the relay UE and a BSR message is sent from the relay UE to the base station. In the non-optimised case data is sent 310 from the remote UE to the relay UE before the BSR is sent. Due to the timing of the BSR and data there are further steps. In the non-optimised case at step 2 the relay UE decodes and repacks the data. At step 3, the relay UE sends the BSR to the base station. The base station decodes the BSR and generates the Scheduling Grant at step 4. At step 5 the base station sends a scheduling Grant. At step 6, the relay UE has a process delay for decoding of the scheduling grant and L1 encoding of the relayed data. At step 7 transmission of the relayed data occurs. In total the process takes about 13 TTIs.

In the optimised case the timing of the BSR is such that the data 312 arrives after the BSR has been sent and constitutes step 1. At step 2, there is transmission of a Scheduling Grant and at step 3 the relay UE decodes and repacks the data and decodes the grant. At step 4 transmission of the relayed data occurs. In total the process takes about 6 TTIs.

FIGS. 3 and 4 illustrate the possible RTT optimization where BSR is used. In the situation where, the relay UE has other on-going communication, the BSR from this communication may be used to control the communications to and from the remote UE. In the situation, where the relay does not have other ongoing transmission, the benefit of the present invention could be even larger since prior to sending the BSR the relay UE may need to send a SR indication or to follow a random access procedure. The timing calculations capture and compare only the steps starting with the data relay over sidelink and until the data is sent over the Uu. The overall RTT may include additional steps but these are expected to be identical in both the optimized and non-optimized cases.

In the optimized case (RHS) it is assumed that the relay receiver is not capable of simultaneous sidelink reception and Uu reception. Where the receiver is capable of simultaneous sidelink reception and Uu reception additional TTI could be subtracted from the optimized RTT. As seen by the above calculation, the expected latency reduction is at least 7 ms but it could be more in some scenarios.

In an alternative embodiment (with similar benefits), it is possible to signal the eNB via a PRG message with no or little additional data. It is possible to avoid sending/receiving information about the expected timing of the data becoming available for transmission or about the amount of expected data.

Figure 5:
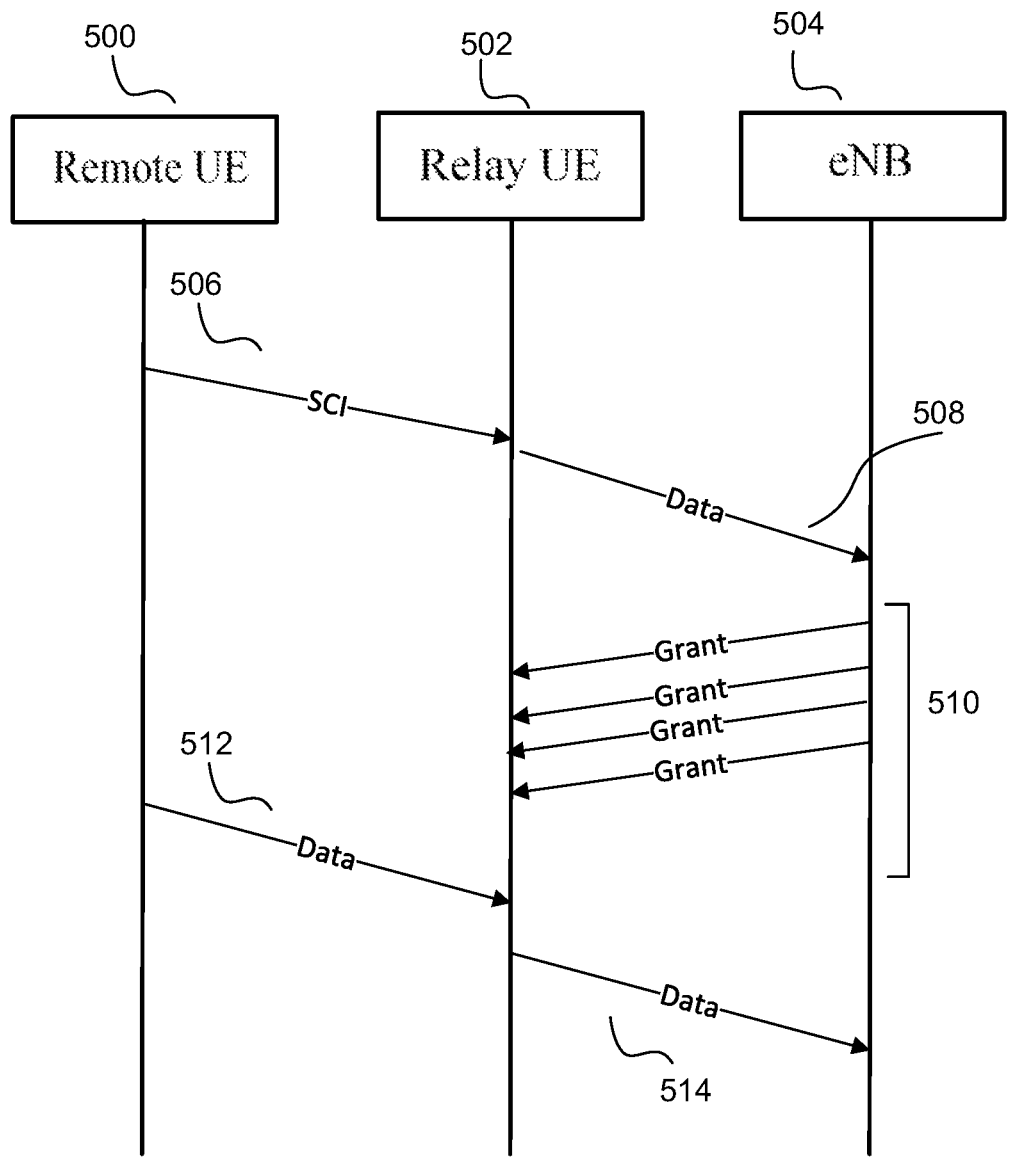
FIG. 5 is a flow chart for data relay using a PRG message, according to an embodiment of the present invention.

As shown in FIG. 5, the eNB can use a simplified PRG signal. The PRG signal can be then used by the eNB as an indication to start pre-allocation or semi-persistent scheduling (SPS). The PRG is simplified in that the PRG is signalling a predictive request for grant without further details about the exact timing, exact size of grant or the QoS level of the data. Whilst this information does exist in a normal BSR, the BSR includes an indication of the size and is sent per LCID which indicates the QoS level and the timing is implicitly known to be now. In FIG. 5 there is a remote UE 500, a relay UE 502 and a base station 504. The remote UE may or may not be in the coverage area of the base station. An SCI 506 is transmitted from the remote UE to the relay UE and a PRG message 508 is sent from the relay UE to the base station followed by a sequence of Scheduling Grants 510 sent from the base station to the relay UE. The eNB does not know exactly when the data should be available for transmission by the relay UE so it provides a number of pre-allocation grants for UL transmissions. Data 512 then arrives at the relay UE. At step 514 transmission of the relayed data occurs from the relay UE to the base station.

It should be noted that pre-allocation is generally supported in LTE, for example with the "skipULpadding" feature. The present invention is also another enhancement in this area. The latency calculation for the FIG. 5 scenario is similar to that described in the table of FIG. 4.

With the "SkipUplinkTx" feature, it is possible for the network to pre-allocate resources (either dynamically or with SPS) with limited impact on UE and system (UE will not transmit padding if it has no data). As such pre-allocation is already implemented in eNB scheduler, based on traffic pattern, resource availability etc. it follows that after sending DL data to a UE, the eNB may pre-allocate UL resource to the UE (if resources are available) as it is very likely that UE will send UL data in response. From this point-of-view, the PRG could be seen as an additional input which could be used by the eNB scheduler to trigger this pre-allocation.

The "SkipUplinkTx" feature allows the network to pre-allocate resources with limited impact on the UE and the system. The UE will not transmit padding if it has no data. The pre-allocated resources may be determined either dynamically or with Semi-Persistent Scheduling (SPS). Such pre-allocation algorithms are assumed to be already implemented in the eNB schedulers, based on traffic patterns, resource availability etc. From this point-of-view, the PRG could be seen as a simple additional input which could be used by the eNB scheduler to trigger pre-allocation. A benefit of this would be in latency reduction as compared to the situation in which pre-allocation is not used without the PRG indication. Pre-allocation is known to make use of a significant amount of resources. A possible result is that it is used only for high priority application while wearables (for which relay is generally used) are usually in lower priority applications and thus less likely to enjoy a feature such as pre-allocation. With PRG the cost of pre-allocation is reduced and there are more chances that the network would use it for wearables too.

Also there is a further benefit in resource efficiency as compared to the situation in which pre-allocation is used. This may relate to longer periods of consecutive pre-allocation grants due to a lower level of certainty achieved by the scheduler algorithms as compared to the certainty achieved by the PRG information.

The achieved air interface latency reduction may be translated into further benefits. For example, higher Transmission Control Protocol via Internet protocol (IP) (TCP)/IP throughput may occur.

In addition, the achieved air interface latency reduction may be translated into power consumption benefit due to shorter communication sessions and quicker return into power saving mode. This is an important benefit of the present invention. For applications which are characterized with short "bursty" communication sessions the achieved power saving may be significant. Since the communication sessions are short to begin with, the relative latency saving is bigger.

It should be noted that the PRG signal could be used in scenarios other than L2 relay. For example, the PRG signal could be used with any scenario which allows predicting UL transmission ahead of the UL transmission availability.

A UE operating as a relay UE, i.e. providing L2 UE-to-network relay to a remote UE, while using the 3GPP sidelink interface as a short range communication channel between the remote UE and itself, may use the SCI sent by the remote UE as a future indication about data about to arrive. The relay may decode the SCI from the remote UE and extract the time allocation for sidelink transmission over PSSCH and notify the higher layer (for example, the MAC layer) of the expected PSSCH decoding time and the possible expected TB (Transport Block) size.

In an embodiment, the SCI would signal TB including a PDCP Protocol Data Unit (PDU)s or including the last segment of a PDCP SDU for relay with a dedicated flag. Optionally the SCI would signal the data size per LCG that the TB is carrying.

It is also proposed to allow the UE to signal the eNB about any potential data which is about to be available for transmission, via a PRG message. This could be seen as a general enhancement from which the eNB may respond with pre-scheduling of UL resources. In the context of feD2D, the potential data which is about to be available for transmission is the relayed data but it could be another type of data in a more general case.

The relay UE may send a PRG message to the eNB, ahead of the expected PSSCH message decoding time to indicate a probable need for PUSCH allocation. This is in accordance to the expected availability of the potential UL data e.g. the predicted PSSCH message decoding time.

In one embodiment, the PRG message may reuse the BSR message. In other words, the BSR is used to provide the serving eNB with information about the predicted amount of data for transmission and the UE sends a BSR ahead of time. This option has been described in FIG. 3.

The PRG message could either signal the estimated predicted UL size or it could be used to signal that there is potential UL data without signalling the data size. For the latter situation, the BSR message could be reused with a special size value, for example, 0.

Optionally the BSR message could be enhanced to indicate that the BSR report is for PRG and/or the PRG BSR would be assigned with a dedicated logic channel group (LCG) by a higher layer. The BSR may be triggered if, for the relay UE, a predicted relay data for uplink transmission is indicated by the physical layer.

In a further option, the PRG message may have a new message structure. It may contain an indication of the expected required UL Grant, such as an indication in Bytes or a coarse indication in KBs or MBs or a general indication for example, for a small or medium or large message according to a predefined or configured threshold of the expected TB size. The new PRG message may contain an explicit indication of the timing of the expected requested UL Grant e.g. by indicating a number of TTIs left until the expected time of UL transmission availability.

If the PRG message is prepared for sending without explicit indication of the timing of the expected requested UL Grant then the requested UL grant timing may be implicitly derived from the time the PRG message is received by the relay UE. The relay UE MAC layer may prepare the PRG message for sending by the lower layer (L1) as early as possible, to allow minimal delay in sending the L2 relay message, but should not be too early such that the UL grant is provided by the time the L2 relay message is already decoded and re-encoded for transmission over the Uu.

A PRG message for expected PSSCH reception in the system frame number (SFN) may be sent after TTI Tprg, which is given by:

$$T_{prg} = n + T_{dual\_receive} - 1 - T_{processing},$$

where: n is the expected time of the PSSCH reception.

Tdual_receive=0 if the relay UE is capable of receiving the sidelink transmission or another short range transmission from the remote UE and Uu DL in the same TTI, otherwise, Tdual_receive=1

Tprocessing is the number of TTIs required by the eNB to process the PRG message. It is also the time required by the relay UE to decode and prepare the received PSSCH transmission for relay.

If the relay UE is not capable of dual receive and Tprocessing=3, the relay UE MAC layer may prepare the PRG message for sending by the lower layer on TTI n−3.

In a general case, the MAC layer of the UE shall prepare the PRG message for sending m subframes before n (the first subframes for which the potential UL data is expected to be available for sending over the Uu). m is the minimum time required for UL grant scheduling which is 1+Tprocessing+ 1+Tprocessing. E.g. If Tprocessing=3 then the PRG message should be prepared for transmission in SF n−8.

In another option the MAC layer may prepare the PRG message for sending immediately after the potential available data is indicated by the physical layer or by a higher layer.

In the situation where the relay UE physical layer expects to decode the sidelink transport block in more or less repetitions or Hybrid Automatic Repeat request (HARQ) transmissions, it may notify the MAC layer on the change in the expected time for the TB to become available.

Once the sidelink transmission is decoded and encoded again as a relayed message, the relay UE may take the relayed message size into account for BSR calculation.

In another embodiment, in which the relay UE is in RRC_IDLE mode when decoding a SCI from a remote UE, the relay UE would have to establish an RRC connection before it can relay the data it is about to receive over sidelink. Normally, a connection establishment procedure for sidelink relay is triggered if the relay UE is configured by upper layers to transmit relay related sidelink communication. If latency reduction is desired, the Relay UE can start a connection establishment procedure immediately after the decoding of SCI from Remote UE. The Relay UE may use an establishment cause to indicate that the connection establishment is for relay purpose e.g. EstablishmentCause-Relay.

For L2 UE-to-network relay transmissions over sidelink, the RLC layer entity segmentation and reassembly operation may be disabled. The PDCP layer may preform segmentation and reassembly instead.

Although not shown in detail any of the devices or apparatus that form part of the network may include at least a processor, a storage unit and a communications interface, wherein the processor unit, storage unit, and communications interface are configured to perform the method of any aspect of the present invention. Further options and choices are described below.

The signal processing functionality of the embodiments of the invention especially the eNB and the UE may be achieved using computing systems or architectures known to those who are skilled in the relevant art. Computing systems such as, a desktop, laptop or notebook computer, hand-held computing device (PDA, cell phone, palmtop, etc.), mainframe, server, client, or any other type of special or general purpose computing device as may be desirable or appropriate for a given application or environment can be used. The computing system can include one or more processors which can be implemented using a general or special-purpose processing engine such as, for example, a microprocessor, microcontroller or other control module.

The computing system can also include a main memory, such as random access memory (RAM) or other dynamic memory, for storing information and instructions to be executed by a processor. Such a main memory also may be used for storing temporary variables or other intermediate information during execution of instructions to be executed by the processor. The computing system may likewise include a read only memory (ROM) or other static storage device for storing static information and instructions for a processor.

The computing system may also include an information storage system which may include, for example, a media drive and a removable storage interface. The media drive may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media may include, for example, a hard disk, floppy disk, magnetic tape, optical disk, CD or DVD, or other fixed or removable medium that is read by and written to by media drive. The storage media may include a computer-readable storage medium having particular computer software or data stored therein.

In alternative embodiments, an information storage system may include other similar components for allowing computer programs or other instructions or data to be loaded into the computing system. Such components may include, for example, a removable storage unit and an interface, such as a program cartridge and cartridge interface, a removable memory (for example, a flash memory or other removable memory module) and memory slot, and other removable storage units and interfaces that allow software and data to be transferred from the removable storage unit to computing system.

The computing system can also include a communications interface. Such a communications interface can be used to allow software and data to be transferred between a computing system and external devices. Examples of communications interfaces can include a modem, a network interface (such as an Ethernet or other NIC card), a communications port (such as for example, a universal serial bus (USB) port), a PCMCIA slot and card, etc. Software and data transferred via a communications interface are in the form of signals which can be electronic, electromagnetic, and optical or other signals capable of being received by a communications interface medium.

In this document, the terms 'computer program product', 'computer-readable medium' and the like may be used generally to refer to tangible media such as, for example, a memory, storage device, or storage unit. These and other forms of computer-readable media may store one or more instructions for use by the processor comprising the computer system to cause the processor to perform specified operations. Such instructions, generally referred to as 'computer program code' (which may be grouped in the form of computer programs or other groupings), when executed, enable the computing system to perform functions of embodiments of the present invention. Note that the code may directly cause a processor to perform specified operations, be compiled to do so, and/or be combined with other software, hardware, and/or firmware elements (e.g., libraries for performing standard functions) to do so.

The non-transitory computer readable medium may comprise at least one from a group consisting of: a hard disk, a CD-ROM, an optical storage device, a magnetic storage device, a Read Only Memory, a Programmable Read Only Memory, an Erasable Programmable Read Only Memory, EPROM, an Electrically Erasable Programmable Read Only Memory and a Flash memory In an embodiment where the elements are implemented using software, the software may be stored in a computer-readable medium and loaded into computing system using, for example, removable storage drive. A control module (in this example, software instructions or executable computer program code), when executed by the processor in the computer system, causes a processor to perform the functions of the invention as described herein.

Furthermore, the inventive concept can be applied to any circuit for performing signal processing functionality within a network element. It is further envisaged that, for example, a semiconductor manufacturer may employ the inventive concept in a design of a stand-alone device, such as a microcontroller of a digital signal processor (DSP), or application-specific integrated circuit (ASIC) and/or any other sub-system element.

It will be appreciated that, for clarity purposes, the above description has described embodiments of the invention with reference to a single processing logic. However, the inventive concept may equally be implemented by way of a plurality of different functional units and processors to provide the signal processing functionality. Thus, references to specific functional units are only to be seen as references to suitable means for providing the described functionality, rather than indicative of a strict logical or physical structure or organisation.

Aspects of the invention may be implemented in any suitable form including hardware, software, firmware or any combination of these. The invention may optionally be implemented, at least partly, as computer software running on one or more data processors and/or digital signal processors or configurable module components such as FPGA devices. Thus, the elements and components of an embodiment of the invention may be physically, functionally and logically implemented in any suitable way. Indeed, the functionality may be implemented in a single unit, in a plurality of units or as part of other functional units.

Although the present invention has been described in connection with some embodiments, it is not intended to be limited to the specific form set forth herein. Rather, the scope of the present invention is limited only by the accompanying claims.

Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognise that various features of the described embodiments may be combined in accordance with the invention. In the claims, the term 'comprising' or "including" does not exclude the presence of other elements.

The invention claimed is:

1. A method for enabling a wireless communication device to operate in a radio access network as a network relay device to a remote device,
   wherein the wireless communication device receives a control indication signal from the remote device as an indication of future data between the wireless communication device and the remote device,
   wherein the network relay device signals to a network node, a buffer status report (BSR) message to indicate the future data requirements,
   wherein the BSR message provides the network node with information about a total predicted amount of data for transmission, and an indication of a timing of expected requested uplink grant,
   wherein the timing is indicated by a number of transmission time intervals (TTIs) left until expected time of uplink transmission availability.

2. The method of claim 1, wherein the BSR message is provided ahead of time.

3. The method of claim 1, wherein the BSR message provides the network node with information that there is potential data without signalling data size.

4. The method of claim 1, wherein the BSR message is assigned with a dedicated logical channel group by a higher layer.

5. The method of claim 1, wherein the BSR message is triggered if a predicted relay data for uplink is indicated by a physical layer.

6. The method of claim 1, wherein the BSR message provides a general indication for a small or medium or large message according to a predefined or configured threshold of an expected transport block size.

* * * * *